United States Patent
Skinner

(10) Patent No.: US 7,162,758 B2
(45) Date of Patent: Jan. 16, 2007

(54) MULTIPURPOSE GRIPPING TOOL

(76) Inventor: Lyle J. Skinner, 633 N. Point Prairie, Wentzville, MO (US) 63385

( * ) Notice: Subject to any disclaimer, the term of this patent is extended or adjusted under 35 U.S.C. 154(b) by 163 days.

(21) Appl. No.: 10/940,439

(22) Filed: Sep. 14, 2004

(65) Prior Publication Data

US 2006/0053563 A1    Mar. 16, 2006

(51) Int. Cl.
B25B 7/22 (2006.01)
B25F 1/00 (2006.01)
B25B 15/00 (2006.01)

(52) U.S. Cl. ............................................. 7/127; 7/164
(58) Field of Classification Search .................... 7/127, 7/158, 129–131, 164; 81/407, 418, 411–414, 81/421–423
See application file for complete search history.

(56) References Cited

U.S. PATENT DOCUMENTS

| | | | |
|---|---|---|---|
| 989,625 A | 4/1911 | McKee | |
| 1,315,644 A | 9/1919 | Sommers et al. | |
| 1,490,220 A | 4/1924 | Lawrence | |
| 1,648,426 A | 11/1927 | Sears | |
| 1,665,504 A | 4/1928 | Midgley | |
| 1,702,689 A | 2/1929 | Duemler | |
| 1,754,035 A | 4/1930 | Morren | |
| 2,507,167 A | 5/1950 | Lemmerman | |
| 2,842,997 A * | 7/1958 | Wentling | 81/418 |
| D231,073 S | 4/1974 | Woslum | |
| 3,816,864 A | 6/1974 | Cotter | |
| 3,894,451 A | 7/1975 | Putsch | |
| 4,332,046 A | 6/1982 | Foley et al. | |
| 4,581,782 A | 4/1986 | Riley | |
| 4,744,272 A | 5/1988 | Leatherman | |
| D297,609 S | 9/1988 | Bellon | |
| D308,810 S | 6/1990 | Murawski | |
| 4,995,128 A | 2/1991 | Montgomery et al. | |
| 5,014,379 A | 5/1991 | Hull et al. | |
| D327,208 S | 6/1992 | Wehling | |
| D331,690 S * | 12/1992 | Villarreal | D8/81 |
| 5,235,755 A | 8/1993 | Fowler | |
| 5,251,353 A | 10/1993 | Lin | |
| 5,285,703 A * | 2/1994 | Carson | 81/423 |
| 5,432,968 A | 7/1995 | Beck | |
| 6,145,418 A * | 11/2000 | Bares | 81/421 |
| 6,202,518 B1 * | 3/2001 | Moffitt et al. | 81/418 |
| 6,216,568 B1 | 4/2001 | Breiling | |
| 6,223,373 B1 | 5/2001 | Yeh | |
| 6,282,996 B1 | 9/2001 | Berg et al. | |
| 6,725,486 B1 | 4/2004 | Oka | |
| 2003/0061916 A1 | 4/2003 | Ping | |
| 2003/0154552 A1 | 8/2003 | Oka | |

OTHER PUBLICATIONS

Klein Tools, Tool Online Catalog, Pliers, 1 page.
Klein Tools, Tool Online Catalog, Conduit Tools, Conduit Reamer, 1 page.

* cited by examiner

Primary Examiner—Hadi Shakeri
(74) Attorney, Agent, or Firm—Senniger Powers

(57) ABSTRACT

A multipurpose tool for gripping an object and determining an orientation of a surface comprises a first arm with a jaw at one end and a grip at an opposite end and a second arm pivotally connected to the first arm about a pivot point. The second arm also has a jaw at one end and a grip at the opposite end. The grips are moveable between an open position for opening the jaws and a closed position for closing the jaws. At least one level vial is mounted on at least one of said arms such that the arm may be placed into engagement with the surface for determining the orientation of the surface.

21 Claims, 15 Drawing Sheets

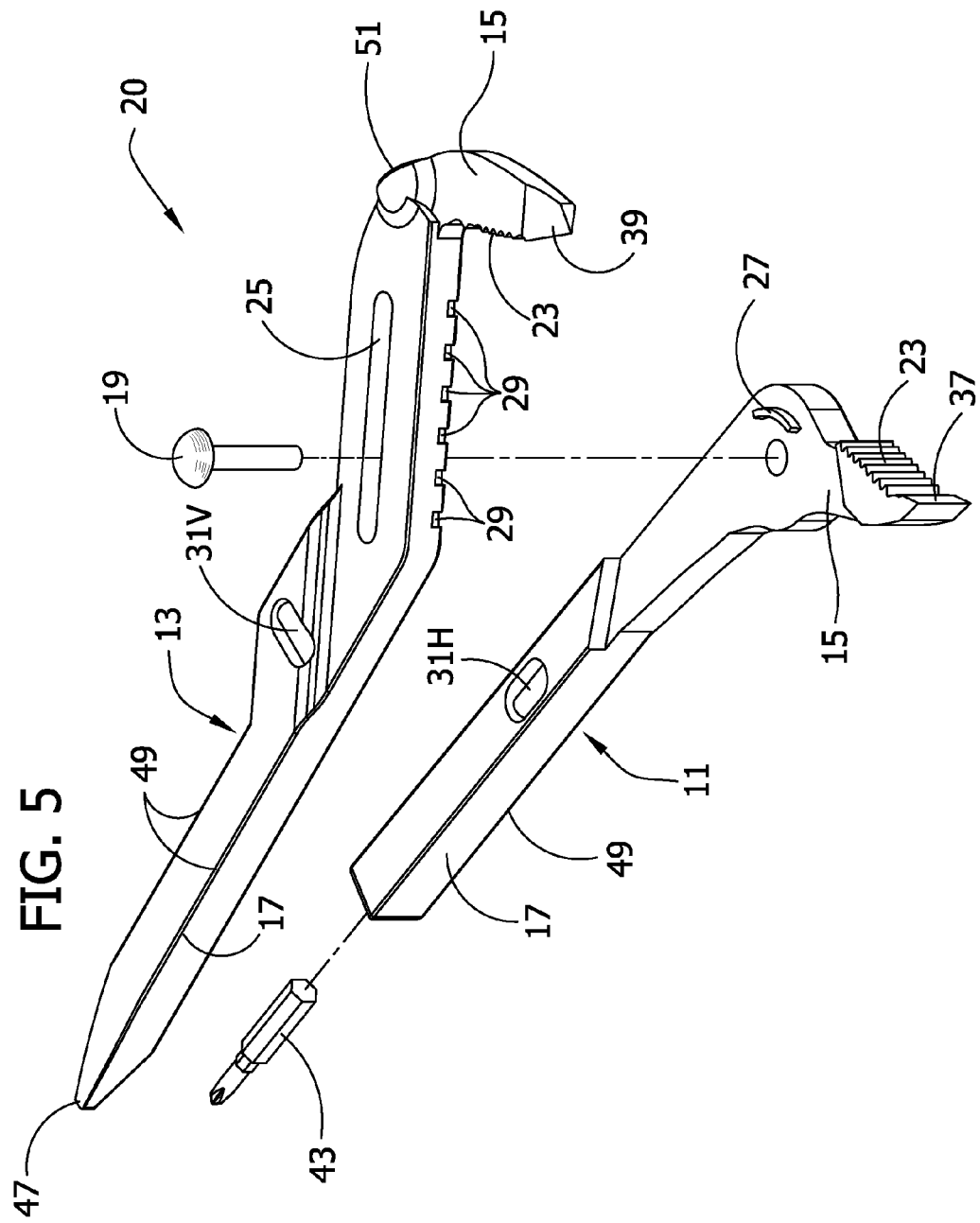

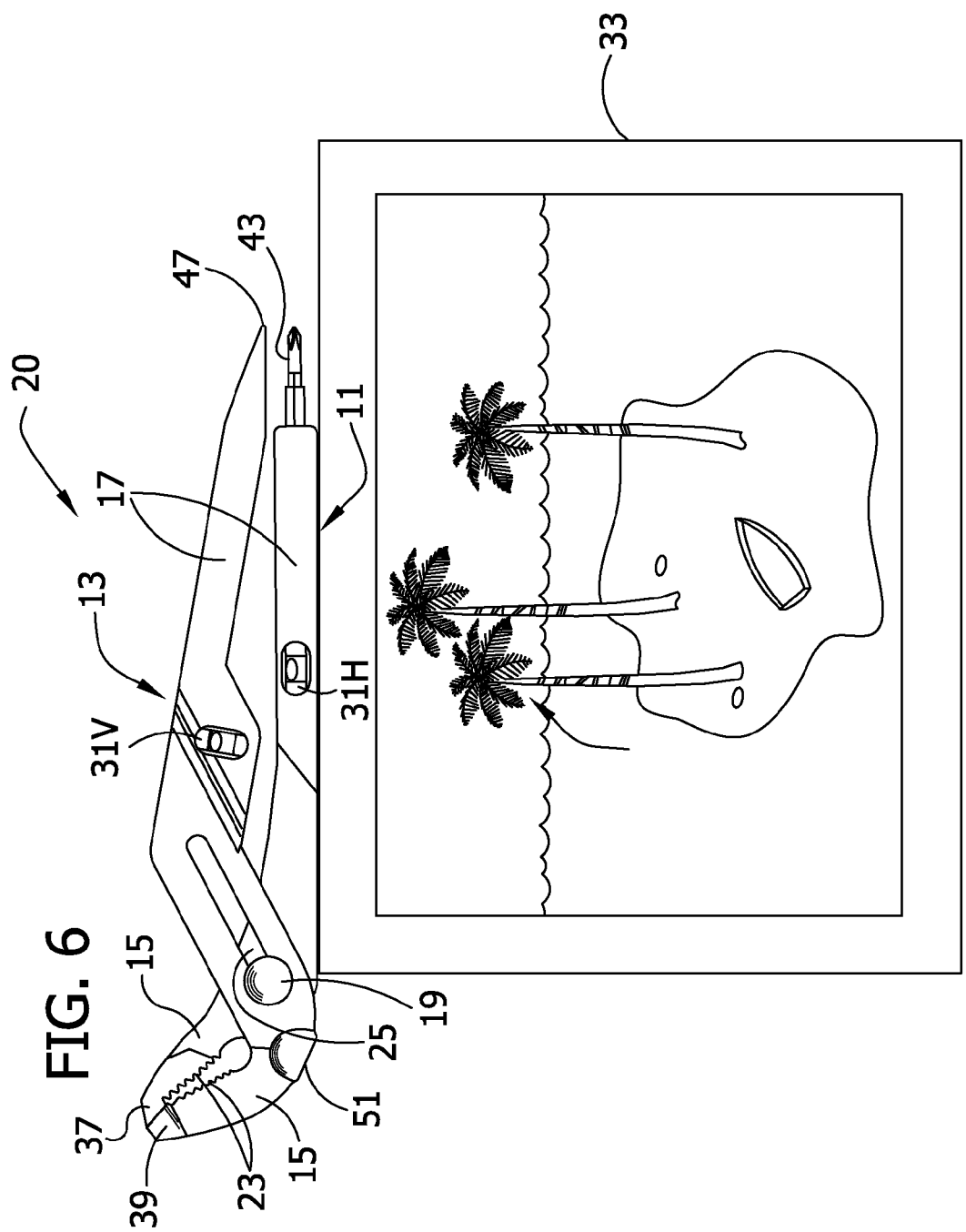

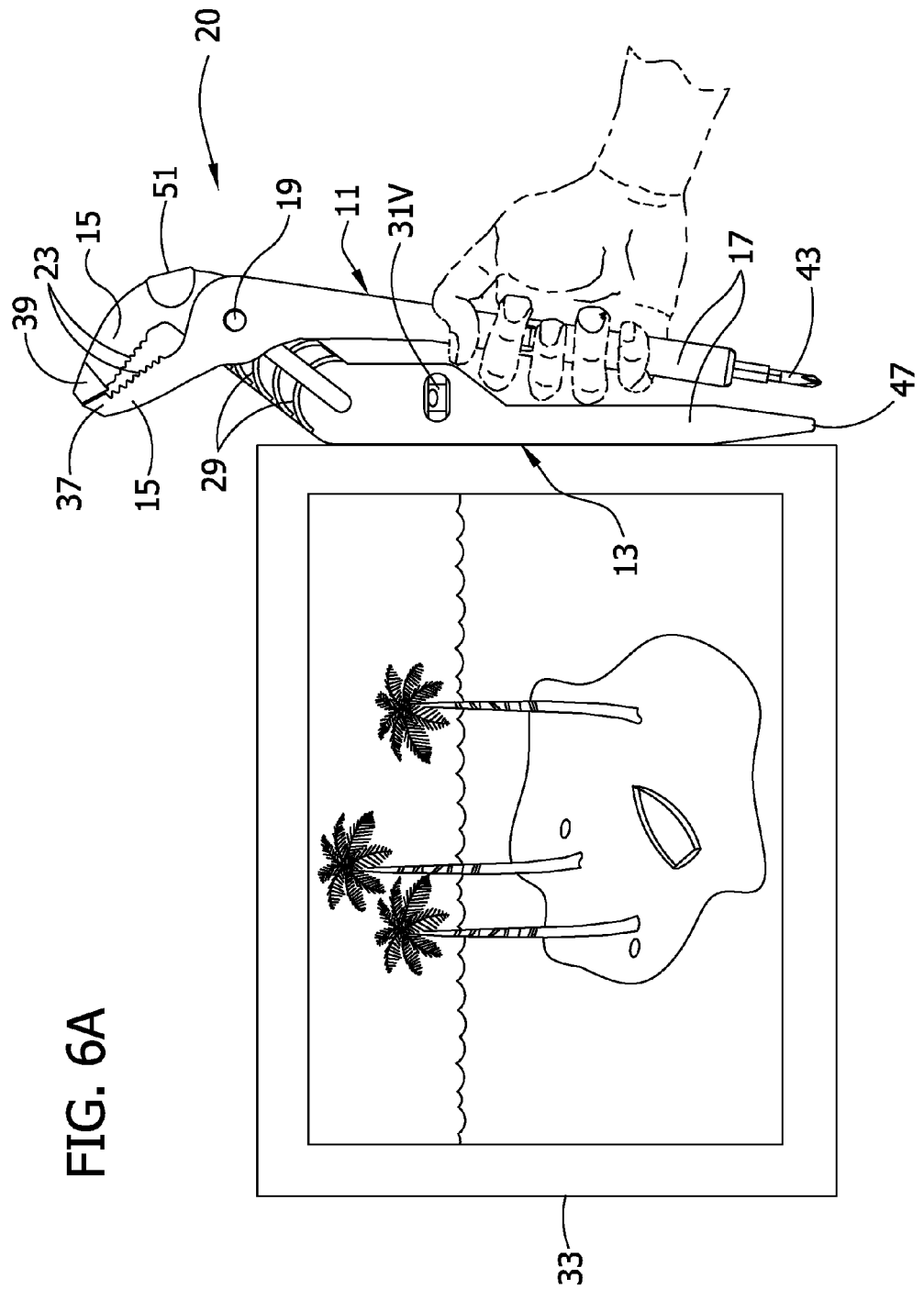

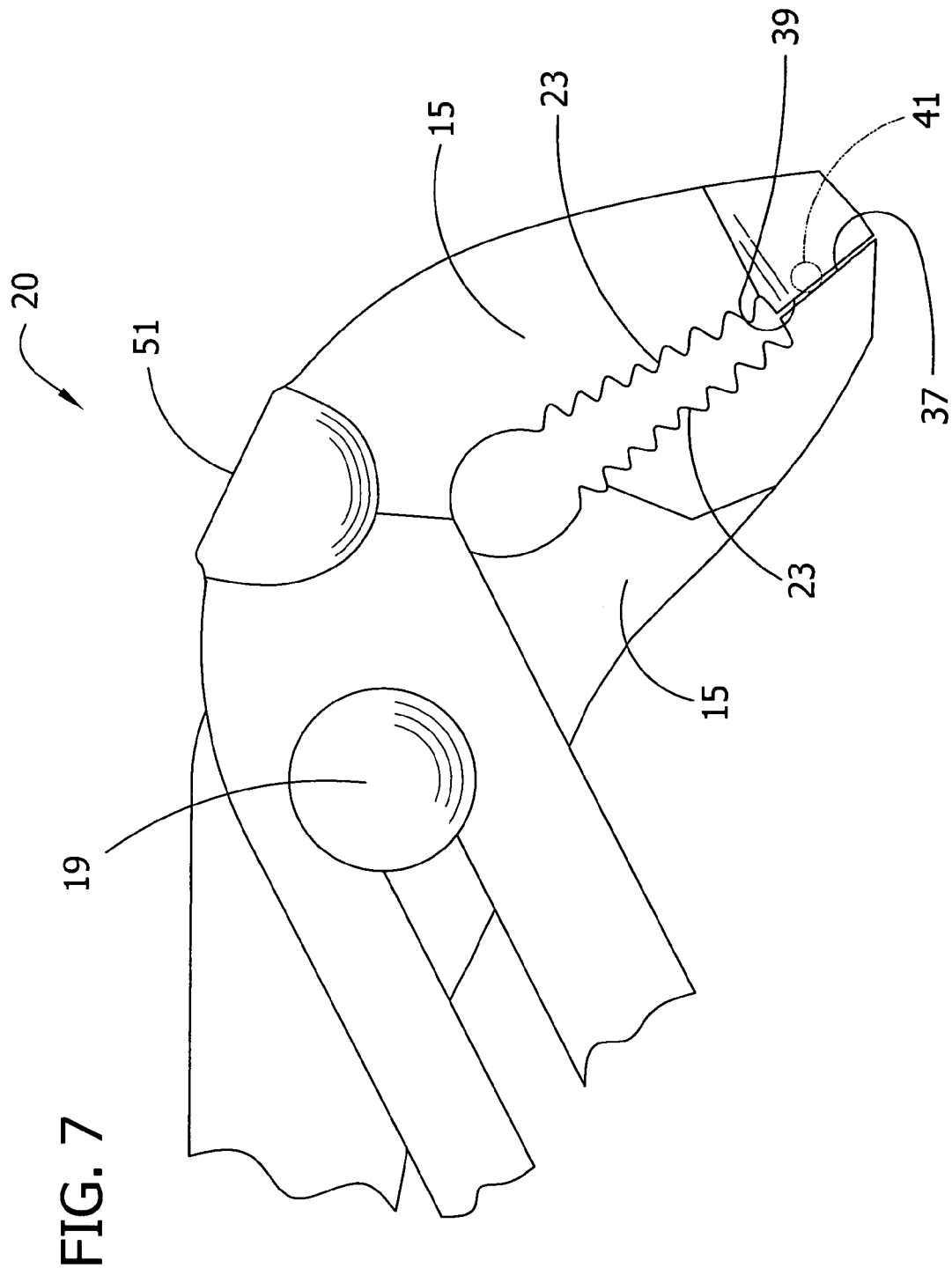

MULTIPURPOSE GRIPPING TOOL

BACKGROUND OF THE INVENTION

This invention relates to hand tools, and in particular to a multipurpose tool.

In many trade professions (e.g., electricians, carpenters, plumbers), it is common for workers to use a variety of hand tools during the course of a single job. As a result, many trade professionals carry a tool belt or other suitable tool carrying device containing numerous tools, each designed for specific tasks. For example, the typical trade professional may carry a hammer for driving nails, variously sized and headed screw drivers for driving screws, variously sized nut drivers for tightening/losing bolts, pliers for gripping objects, a level for checking vertical and/or horizontal orientation of a surface, a burr remover for removing burrs from cut ends of pipe, and snips for cutting. Collectively, these tools are heavy and inconvenient to carry. In addition, keeping track of a large number of tools at a job site is difficult. As a result, there is a significant potential for losing or misplacing one or more of the tools. Moreover, purchasing a large number of tools is costly.

SUMMARY OF THE INVENTION

In general, a multipurpose tool of the present invention is configured for gripping an object and determining an orientation of a surface. The tool generally comprises a first arm with a jaw at one end and a grip at an opposite end and a second arm pivotally connected to the first arm about a pivot point. The second arm also has a jaw at one end and a grip at the opposite end. The grips are moveable between an open position for opening the jaws and a closed position for closing the jaws. At least one level vial is mounted on at least one of said arms such that the arm may be placed into engagement with the surface for determining the orientation of the surface.

In another aspect, a multipurpose gripping tool of the present invention comprises a first arm having a jaw at one end and a grip at the opposite end and a second arm pivotally connected to the first arm about a pivot point, The second arm also has a jaw at one end and a grip at the opposite end. An adjustable channel engagement system allows the second arm to slide relative to the first arm to adjust the pivot point of the arms and thereby adjust the distance between the jaws for engaging and grasping differently sized objects. The tool also comprises a cutting device including an anvil located generally at a distal portion of one of the jaws and a blade located generally at a distal portion of the other jaw. The blade faces the anvil for cooperating with the anvil to cut.

In yet a further aspect, a multipurpose gripping tool of the present invention comprises a tongue and groove pliers having a first arm including a jaw at one end and a grip at the opposite end, and a second arm pivotally attached to the first arm about a pivot point. The second arm includes a jaw at one end and a grip at the opposite end. A cutting device includes an anvil located generally at a distal portion of one of the jaws and a blade located generally at a distal portion of the other of jaws. The blade faces the anvil for cooperating with the anvil to cut. At least one level vial is mounted on one of the arms.

Other objects and features of the present invention will be in part apparent and in part pointed out hereinafter.

BRIEF DESCRIPTION OF THE DRAWINGS

FIG. 5 is an exploded view of the multipurpose gripping tool.

FIG. 6 is an elevation showing the tool being use to determine the horizontal orientation of a picture on a wall;

FIG. 6A is an elevation showing the tool being used to determine the vertical orientation of the picture of FIG. 6;

FIG. 7 is an enlargement of jaws showing the tool being used to cut an object;

Corresponding reference characters indicate corresponding parts throughout the views of the drawings.

DETAILED DESCRIPTION OF THE INVENTION

Figure 1:
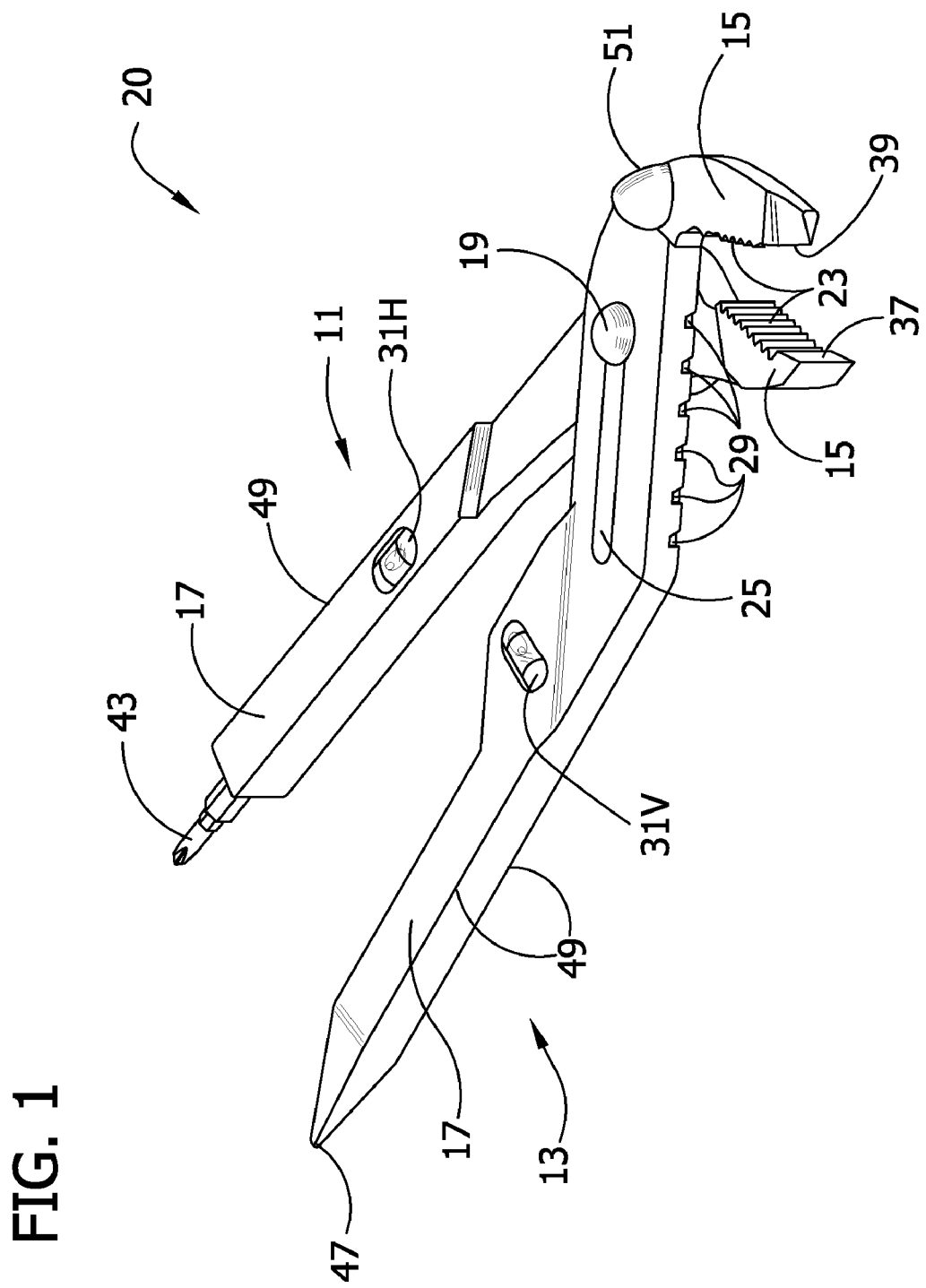
FIG. 1 is a front side perspective of a multipurpose gripping tool of the present invention.
Figure 2:
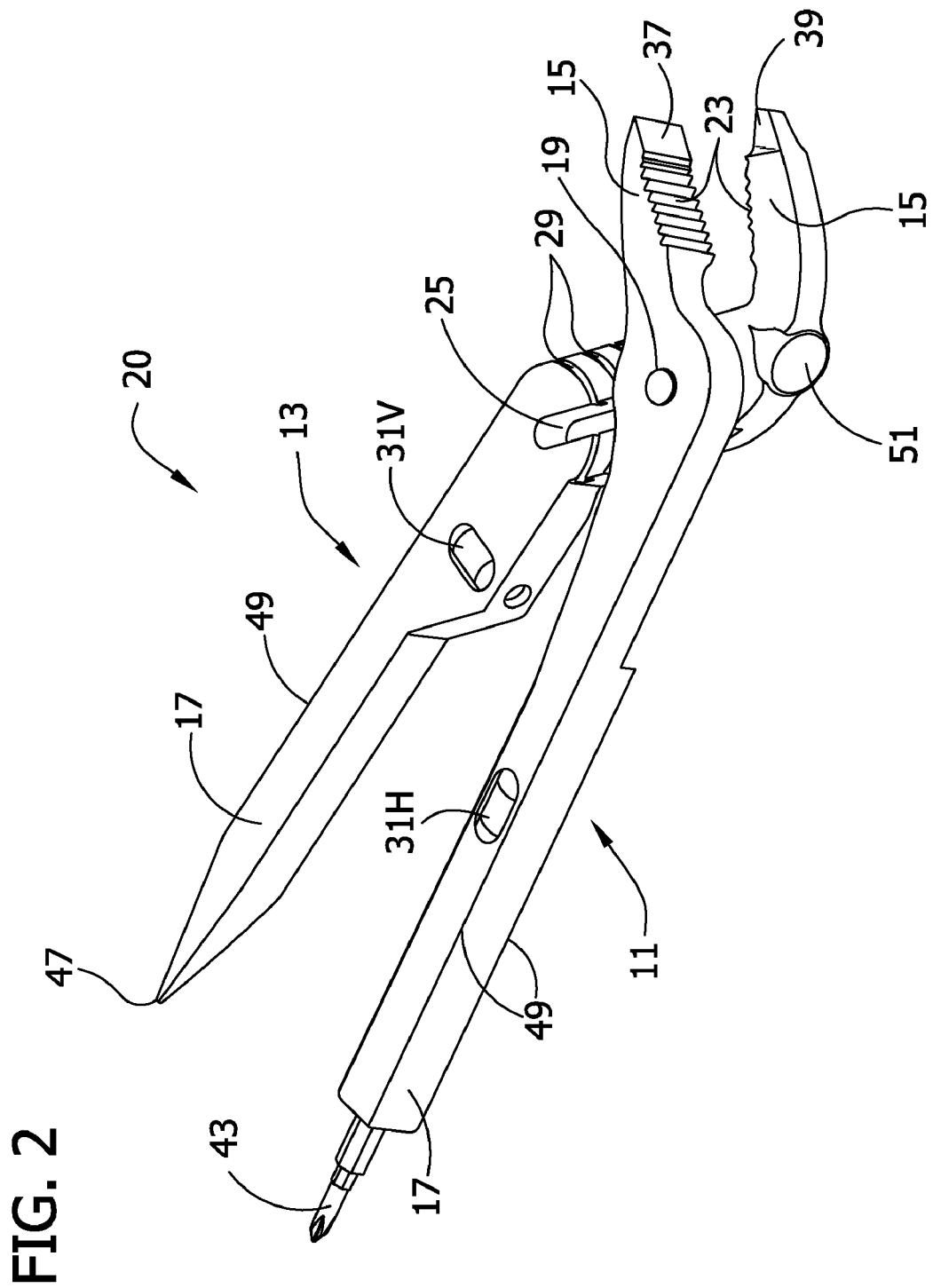
FIG. 2 is a back side perspective of the multipurpose gripping tool of FIG. 1.

Referring now to the drawings and in particular to FIGS. 1 and 2, a multipurpose tool of the present invention is designated generally by 20. In one embodiment, the multipurpose tool 20 comprises adjustable pliers having horizontal and vertical levels, a cutting device, a nut driver or screwdriver, a reamer, a burr remover, and a hammer. Accordingly, the multipurpose tool 20 provides a single tool having the functional capabilities of many tools. Importantly, many of the features of the multipurpose tool 20 can be used in a manner substantially similar to their conventional counterparts that are formed as separate tools, as described in more detail below. It is understood that the multipurpose tool 20 may have more or fewer integral tools than those described without departing from the scope of this invention.

Figure 3:
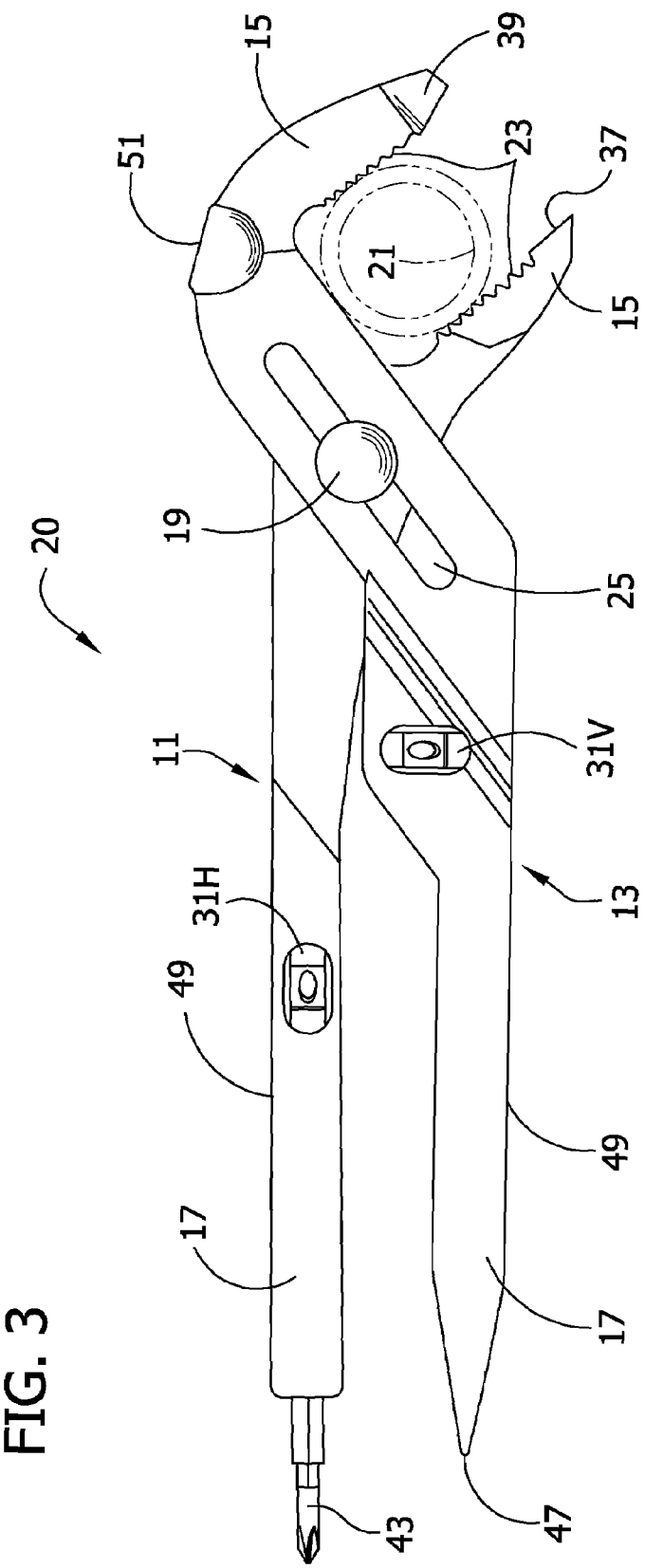
FIG. 3 is a front side elevation of the multipurpose gripping tool.
Figure 11:
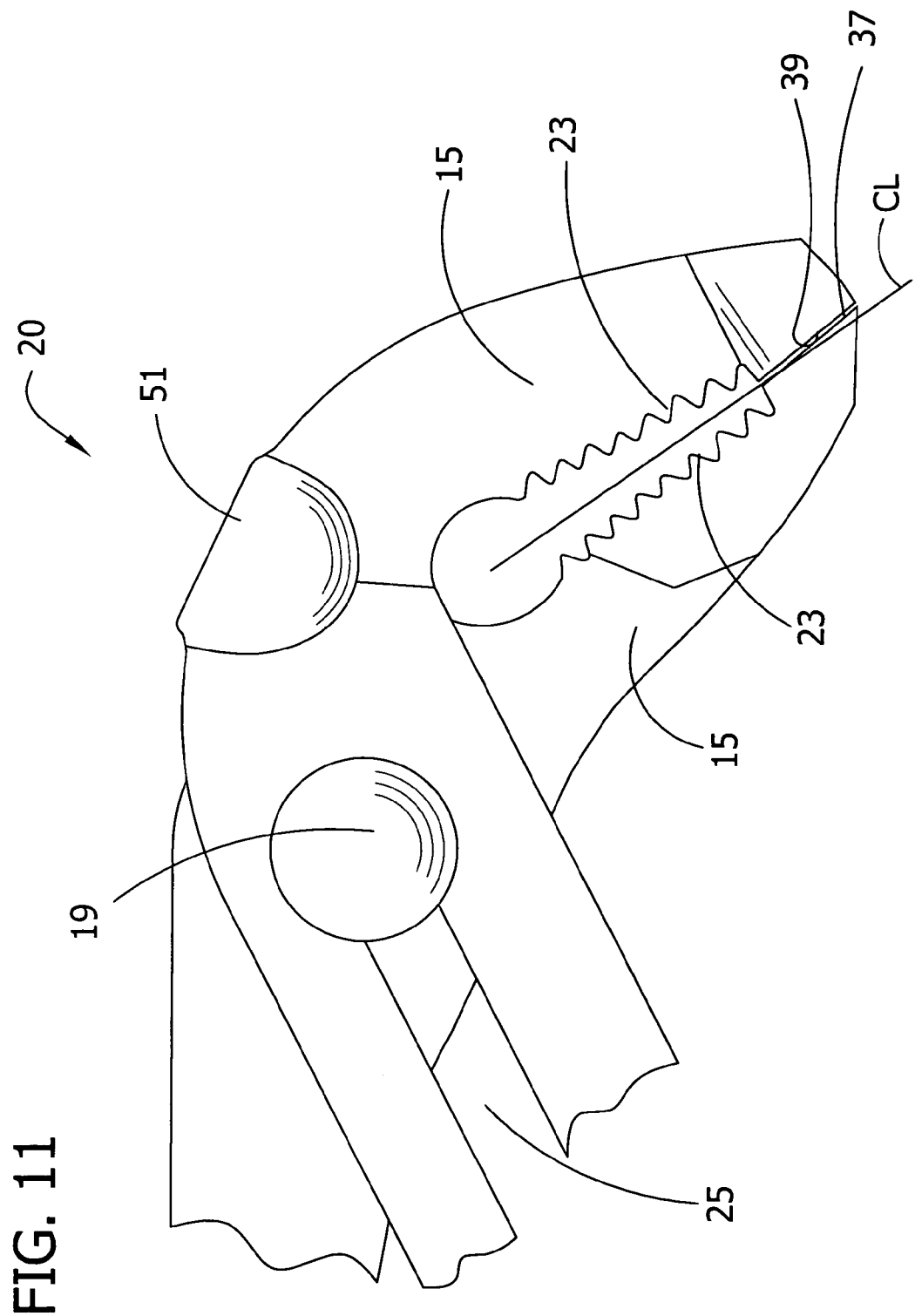
FIG. 11 is an elevation of the multipurpose gripping tool showing an angled cutting blade and anvil.

The multipurpose tool 20 comprises a first arm, generally indicated at 11, and a second arm, generally indicated 13. Each of the arms 11, 13 is generally elongate and comprises a jaw 15 at one end and a grip 17 at an opposite end. The arms 11, 13 are fixed in pivotal relation to each other about a pivot axis. The arms 11, 13, jaws 15 and pivot 19 form the aforementioned pliers. The jaws 15 are moveable between an open position and a closed position in a conventional way. The jaws 15 are moved to the open position by manually spreading the grips 17 of the first and second arms 11, 13 apart. The jaws 15 are moved to the closed position by squeezing the grips 17 of the first and second arms 11, 13 towards each other. As a result, the adjustable pliers of the multipurpose tool 20 can be used to grasp and/or hold variously sized and shaped objects. For example, as shown in FIG. 3, the jaws 15 can be used to grasp a pipe 21 (shown in phantom). Moreover, the jaws 15 of the first and second arms have teeth 23 for engaging and gripping an object. As illustrated in FIG. 11, the jaws 15 of the first and second arms 11, 13 are slightly angled with respect to a centerline CL for improved gripping ability. Referring again to FIG. 3, the slightly angled jaws 15 allow more of the teeth 23 to contact an object, such as pipe 21, being gripped than if the jaws were substantially straight. While the illustrated embodiment is shown with slightly angled jaws, it is understood that the jaws may have other configurations (e.g., straight, needlenose, V-jaw) without departing from the scope of this invention.

Figure 4:
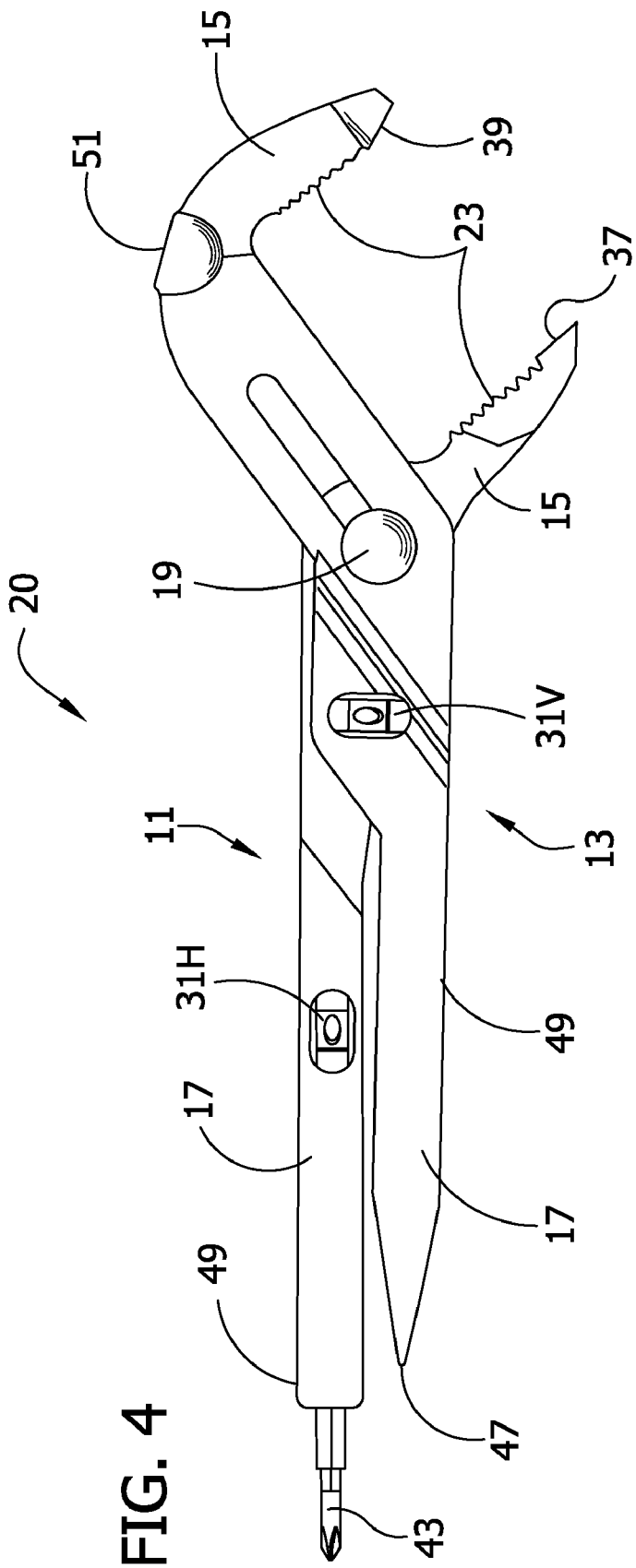
FIG. 4 is an elevation of the multipurpose gripping tool in a closed position with its jaws fully extended.

In the illustrated embodiment, the pivot axis is selectively adjustable. The pivot axis is defined by a pivot pin 19 affixed to the first arm 11 and received through a slot 25 in the second arm 13. The slot 25 in the second arm 13 allows the second arm to slide relative the first arm 11 from a narrow jaw spacing position (FIG. 1) to an extended position (FIG. 4). An adjustable channel engagement system is used to maintain the pivot axis in a selected position. The adjustable channel engagement system is a tongue and groove system wherein the first arm 11 has one arcuate tongue 27 and the second arm 13 comprises six grooves 29 (FIG. 5). A greater or lesser number of grooves 29 and a greater number of tongues 27 may be provided with the scope of the present invention. The tongue 27 is adapted to align with and slide within any of grooves 29 thereby maintaining the pivot axis in a selected position. The pivot axis of the arms 11, 13 can be adjusted by moving the tongue 27 to a different groove 29 by sliding the pivot pin 19 through the slot 25. The tongue 27 can be moved to a different groove 29 by spreading the arms 11, 13 to their fully extended position, thereby disengaging the tongue from the grooves. The range of motion of the tongue 27 is slightly greater then the length of the grooves 29. Once the tongue 27 is moved beyond the grooves 29, the pivot pin 19 of the first arm 11 freely slides through the slot 25 of the second arm 13. The re-engagement of the tongue 27 with a selected groove 29 is achieved by aligning the tongue with a groove and moving the arms 11, 13 towards their closed position. It is understood that the pivot axis may be fixed (e.g., solid joint, nut and bolt) or adjustable using other structure (e.g., self adjustable, slip joint, box joint) without departing from the scope of this invention.

The multipurpose tool 20 further comprises at least one level vial 31 mounted on at least one of the arms 11, 13 so that the arm may be placed into engagement with a surface for determining the orientation of the surface (FIGS. 6 and 6A). In the illustrated embodiment, the multipurpose tool 20 has a horizontal level vial 31H mounted in the first arm 11 and a vertical level vial 31V mounted in the second arm 13. Accordingly, the deviation of a surface from horizontal can be determined by laying an outwardly facing surface of the first arm 11 flat against the surface. For example, the tool 20 is shown in FIG. 6 being used to achieve a horizontal orientation of a picture frame 33. As shown in FIG. 6A, the orientation of the picture frame relative to vertical can be determined by orienting the tool 20 lengthwise vertically and placing the outwardly facing surface of the second arm 13 flat in engagement with the frame. In the illustrated embodiment, both the horizontal level vial 31H and the vertical level vial 31V are positioned for use by moving the jaws 15 to the fully retracted, closed positioned. In this position, the other features of the multipurpose tool 20 do not interfere with the use of the tool as a level.

In one configuration, the level vials 31 are rotatably mounted on the tool, thereby allowing the level vial to be selectively positioned in the desired orientation. Thus, the same level vial 31 can be used to determine the deviation of a surface relative to horizontal, vertical, or any angle in between. In another configuration (not shown), the multipurpose tool 20 may have a horizontal level vial 31H, a vertical level vial 31V, and a rotatable level vial (not shown). The multipurpose tool 20 may have any number of level vials 31, and the level vials may be mounted in the same arm 11, 13 or different arms.

The multipurpose tool 20 further comprises a cutting device. The cutting device includes an anvil 37 located generally at a distal portion of the jaw 15 of the first arm 11 and a blade 39 located generally a distal portion of the jaw of the second arm 13 (FIG. 1). The blade 39 faces the anvil 37 for cooperating with the anvil to cut. Since the blade 39 is located on the jaw 15 of the first arm and the anvil 37 on the jaw of the second arm 13, the blade and anvil are movable with the jaws. To cut, the jaws 15 are moved to their open position by spreading the grips 17 of the first and second arms 11, 13 apart to allow an object to be placed between the blade 39 and anvil 37. Once the object to be cut is in place, the jaws 15 are moved to their closed position by squeezing the grips 17 of the first and second arms 11, 13 together thereby bringing the blade 39 and anvil 37 into contact with opposite sides of the object. The blade 39 cuts the object as the blade and anvil 37 move toward each other. FIG. 7 illustrates the tool 20 cutting a piece of wire 41 (shown in phantom). The anvil 37, which has a generally large surface area as compared to the blade 39, compensates for any lateral movement in the jaws 15, thereby ensuring that the blade is properly positioned for cutting. Slight lateral movement at the distal ends of the jaws 15 is common in tongue and groove systems. As a result, some conventional cutting devices, which have two opposed blades, would be difficult to properly align using a tongue and groove system.

Because of its position on the distal portion of the jaws 15, the cutting device is suitable for use in tight spaces or to cut a single wire in a tight bundle of wires. With some conventional cutters, where the cutting blades are positioned nearer the pivot point at the base of the jaws to increase cutting force, cutting in tight spaces is difficult because the length of the jaws interferes with cutting. Moreover, the blade 39 may be angled slightly away from the centerline CL of the jaws 15 to prevent inadvertent contact between the blade and objects being gripped by the jaws (FIG. 11). Thus, the blade is positioned to reduce marring or scratching of objects gripped by the tool, and the blade is kept in good working condition by minimizing dulling of the blade.

Figure 12:
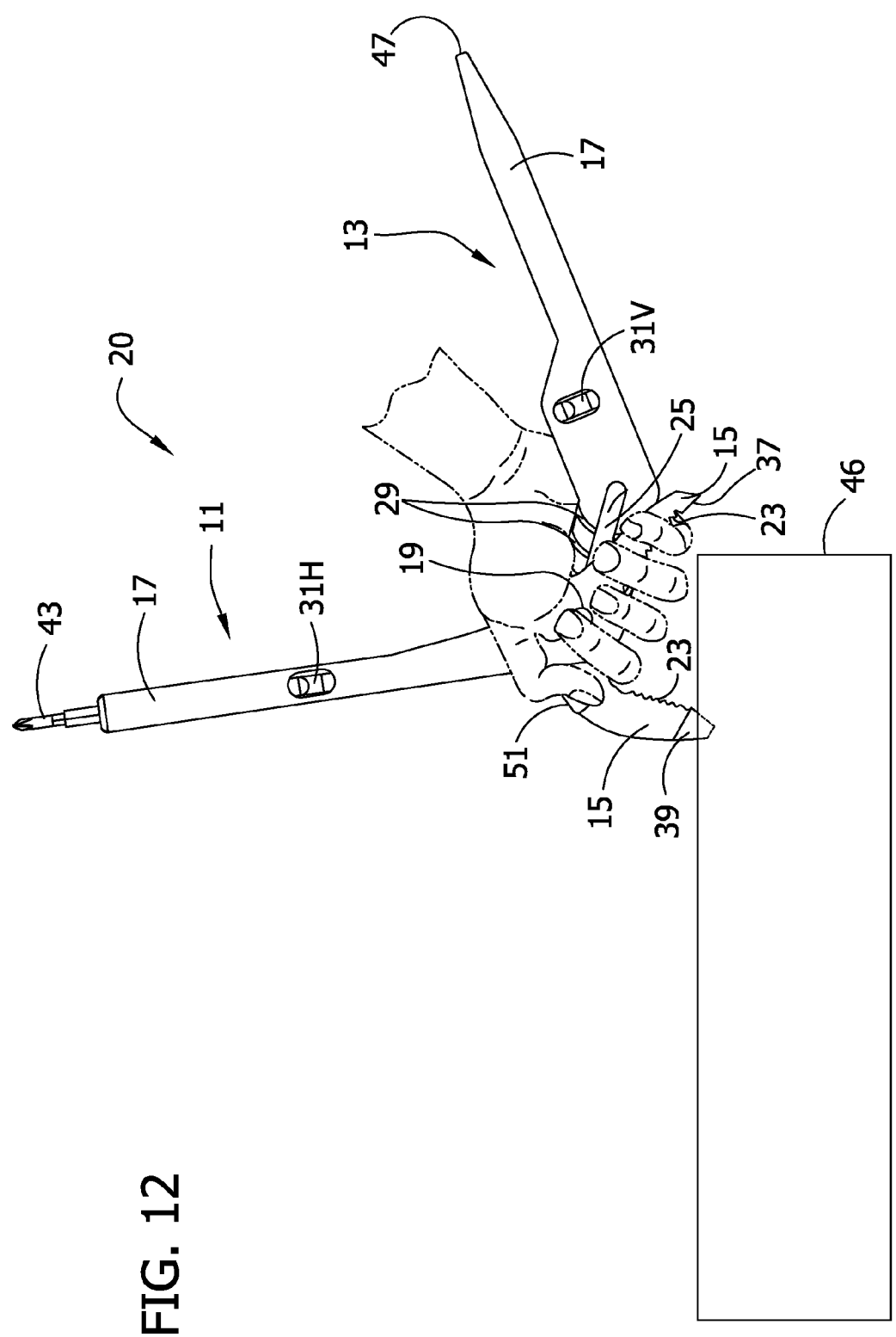
FIG. 12 is an elevation showing the tool being used to open a sealed box.

In addition, the blade 39 of the cutting device can be used independently of the anvil 37 as a box cutter (FIG. 12). In this configuration, the anvil 37 is moved to a position remote from the blade 39 by spreading the grips 17 of the first and second arms 11, 13 apart to move the jaws 15 to the open position. As a result, the blade 39 is suitably isolated for cutting objects by contacting the object with the blade and pulling the blade across or through the object as one would do using a conventional box cutter. For example, FIG. 12 illustrates the blade 39 of the multipurpose tool 20 being used to open a sealed box 46.

Figure 8:
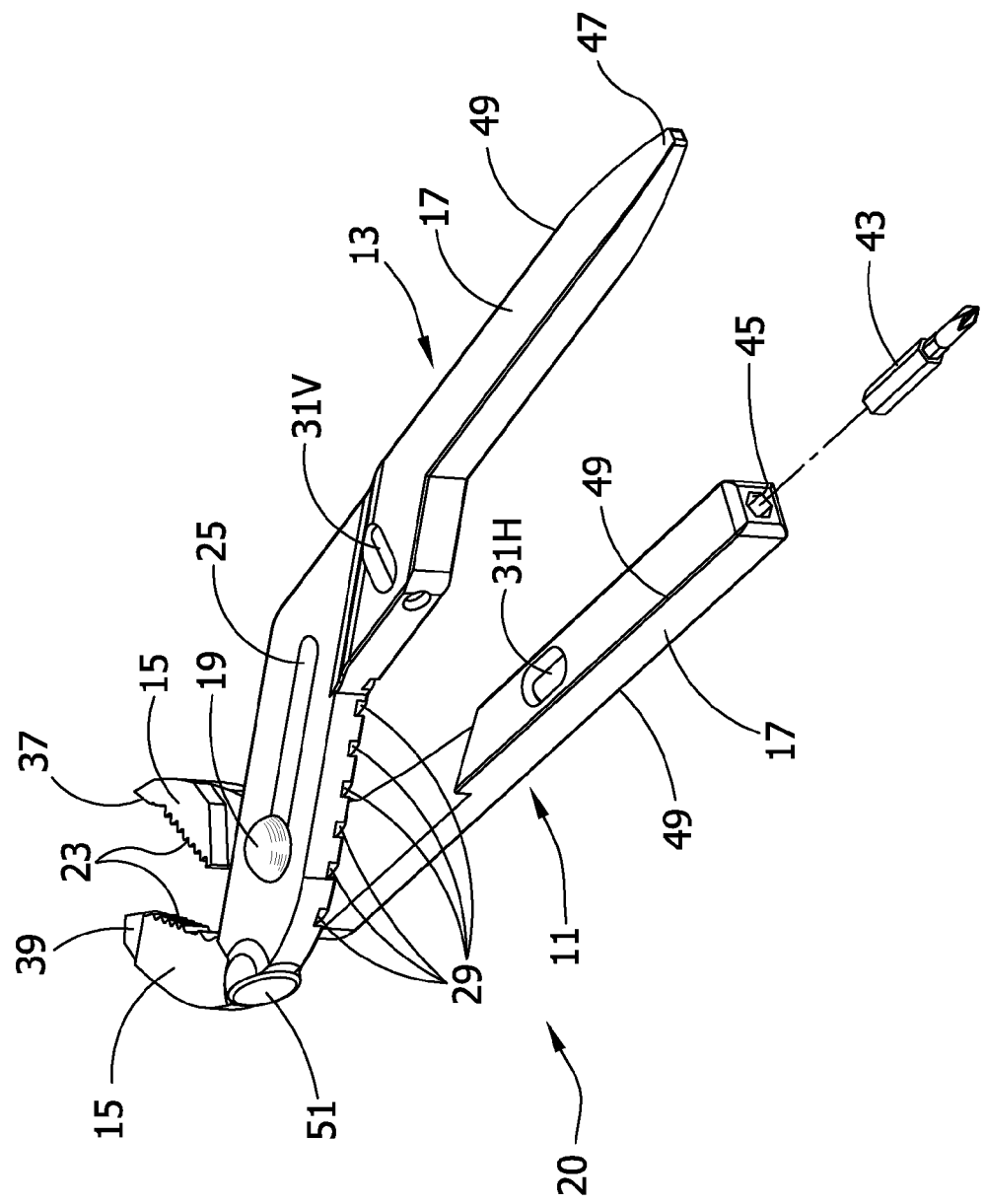
FIG. 8 is a perspective showing a socket in the tool for receiving a bit.

At least one of the arms 11, 13 of the multipurpose tool 20 is adapted to releasably mount a nut driver (not shown) or a screwdriver bit 43. In the embodiment illustrated in FIG. 8, the first arm 11 has a socket 45 in an end of the arm for selectively receiving a nut driver or a screwdriver bit 43. Rotational leverage can be increased by moving the jaws 15 to the open position thereby pivoting the second arm 13 to a position extending radially outward from a longitudinal axis of the first arm 11. The second arm 13 can then be rotated about the first arm 11 for tightening or loosening fasteners (e.g., bolts, screws). A greater amount of leverage is applied to the fastener using the multipurpose tool 20 as compared to a conventional screwdriver because the second arm 13 provides a longer liner arm for applying torque. In one embodiment, the socket 45 is sized and shaped to receive a 5/16 inch hexagonal bit. The bit 43 may have variously sized and shaped heads including, but not limited to, phillips, flat, square, or hexagonal. The bit 43 may also be a single or double-headed bit. The socket 45 may have magnetic portion or a ball detent for holding the bit 43 in the socket. It is understood that the socket 45 may be located in the grip 17 of the second arm 13.

The grip 17 of the second arm 13 has a rounded and tapered end 47 adapted to function as a reamer. The reamer can be used to sort a bundle of wires, as commonly found in a load center (i.e., circuit box, breaker box) or a junction box. The rounded end 47 can be inserted into the bundle and used to separate a wire or group of wires from the bundle. The end is rounded to protect the sorted wires, and the end is tapered to provide a larger opening as the reamer is inserted further into the bundle. Such a reamer is useful when creating sub-bundles from a large bundle. Such a reamer is also useful in locating a single wire in a large bundle. Accordingly, a wire or group of wires can be isolated from the remainder of the bundle. It is understood that the reamer may be formed on the grip of the first arm 11.

Figure 9A:
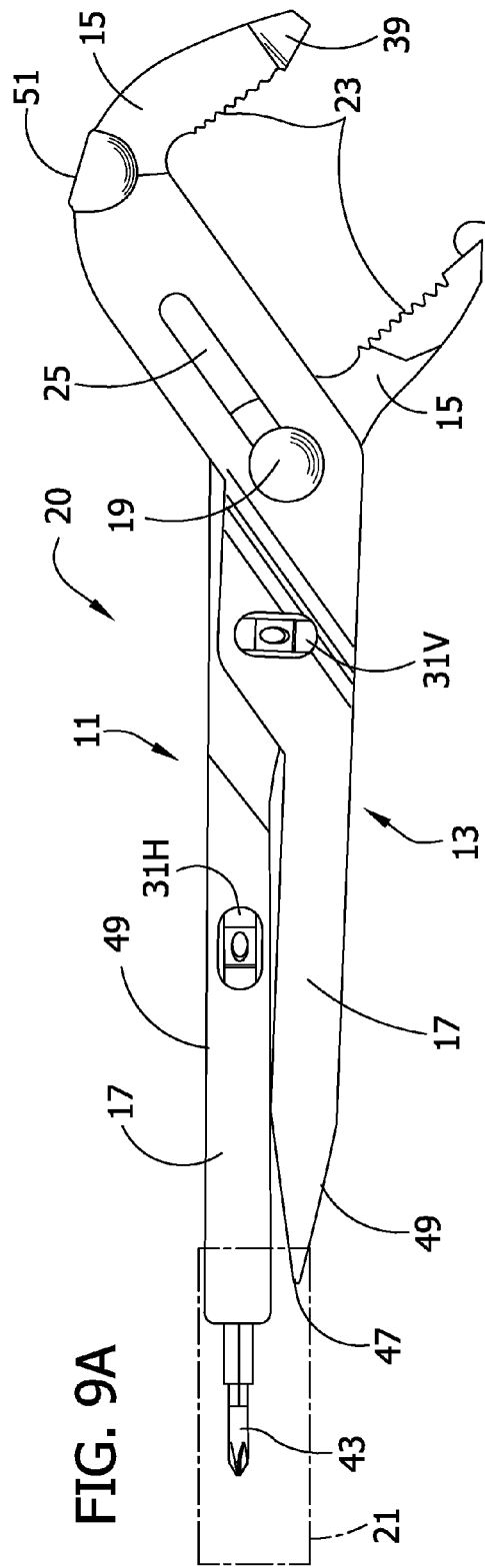
FIG. 9A is an elevation showing two arms of the tool being used collectively to deburr a pipe.
Figure 9B:
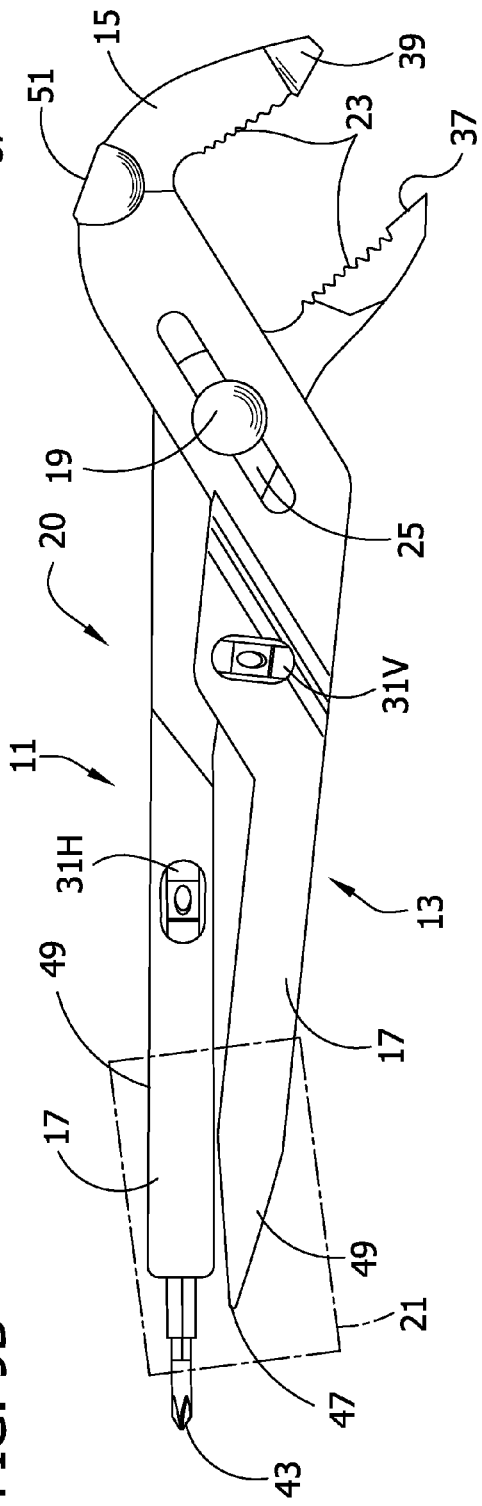
FIG. 9B is another elevation showing the two arms of the tool being used to deburr a pipe with a larger diameter then the pipe illustrated in FIG. 9A.
Figure 9C:
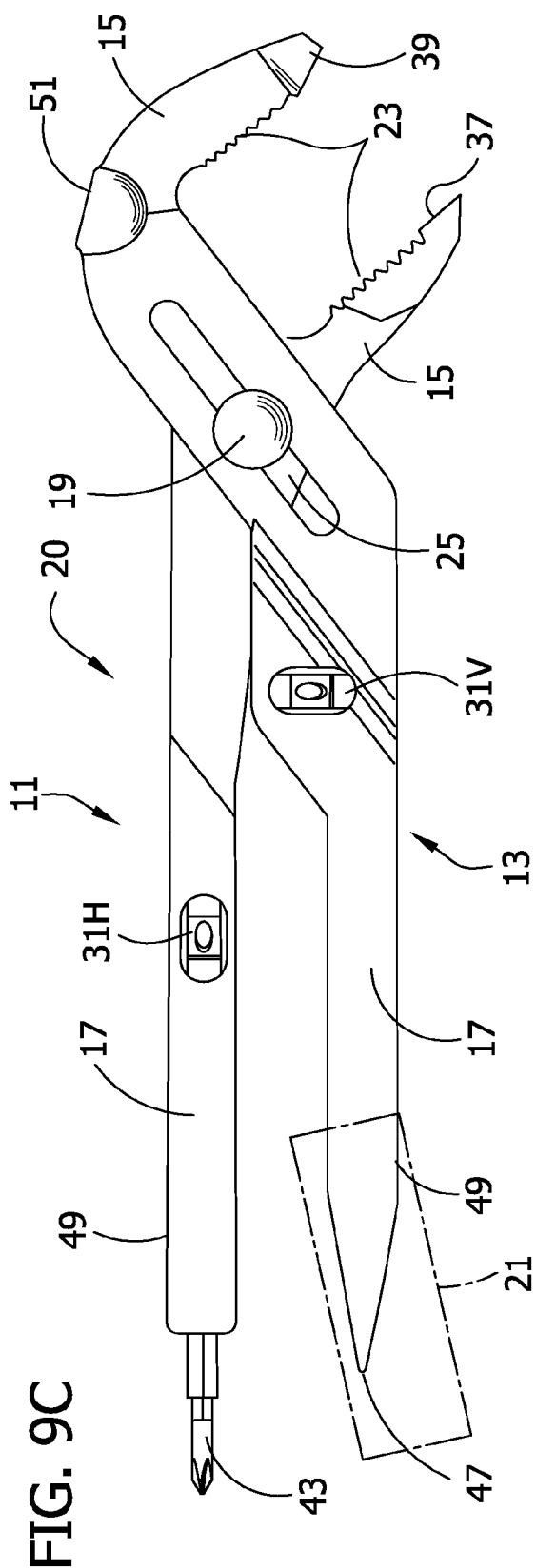
FIG. 9C is an elevation showing one arm of the tool being used to deburr a small diameter pipe.
Figure 10:
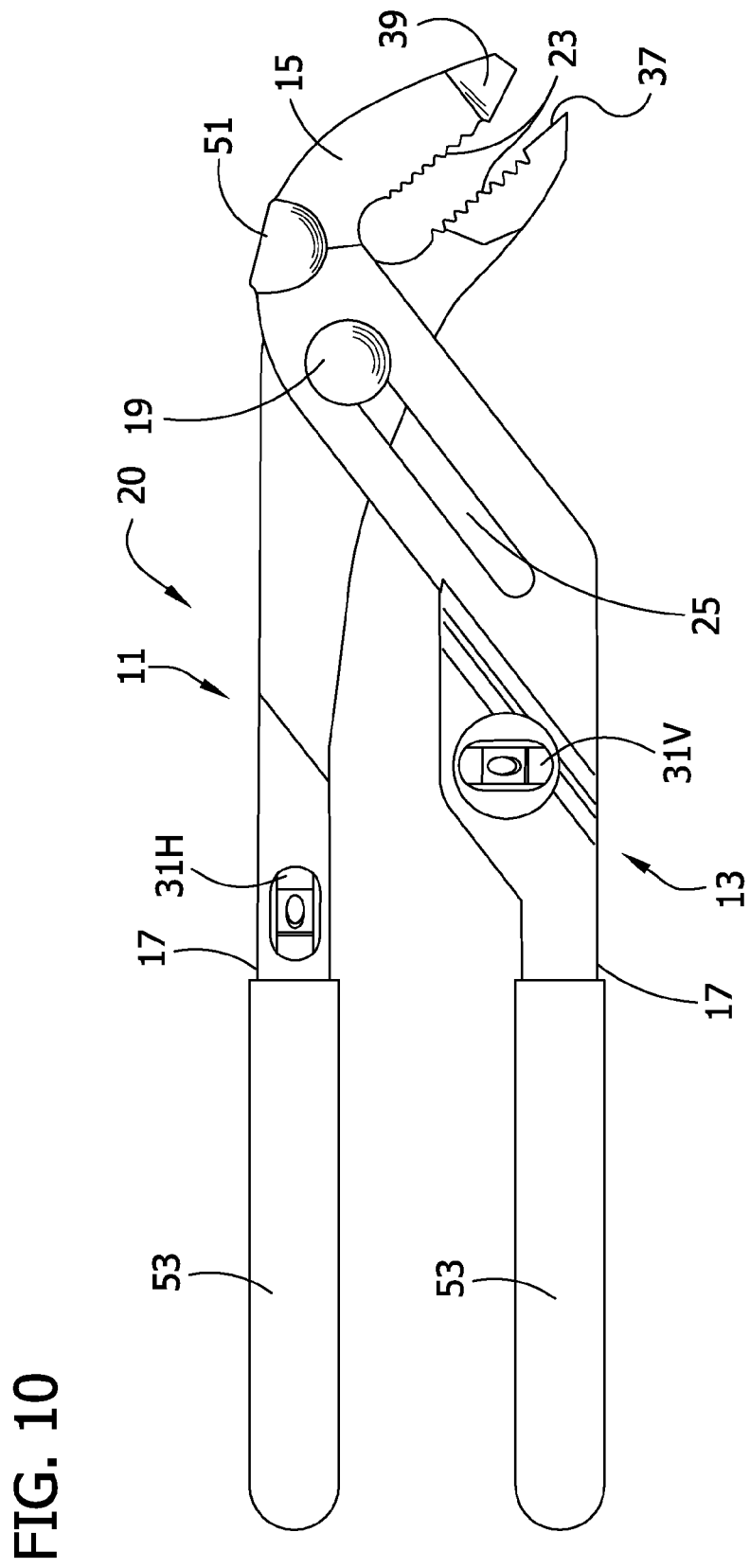
FIG. 10 is a front side elevation of the multipurpose gripping tool having grip covers.
Figure 10A:
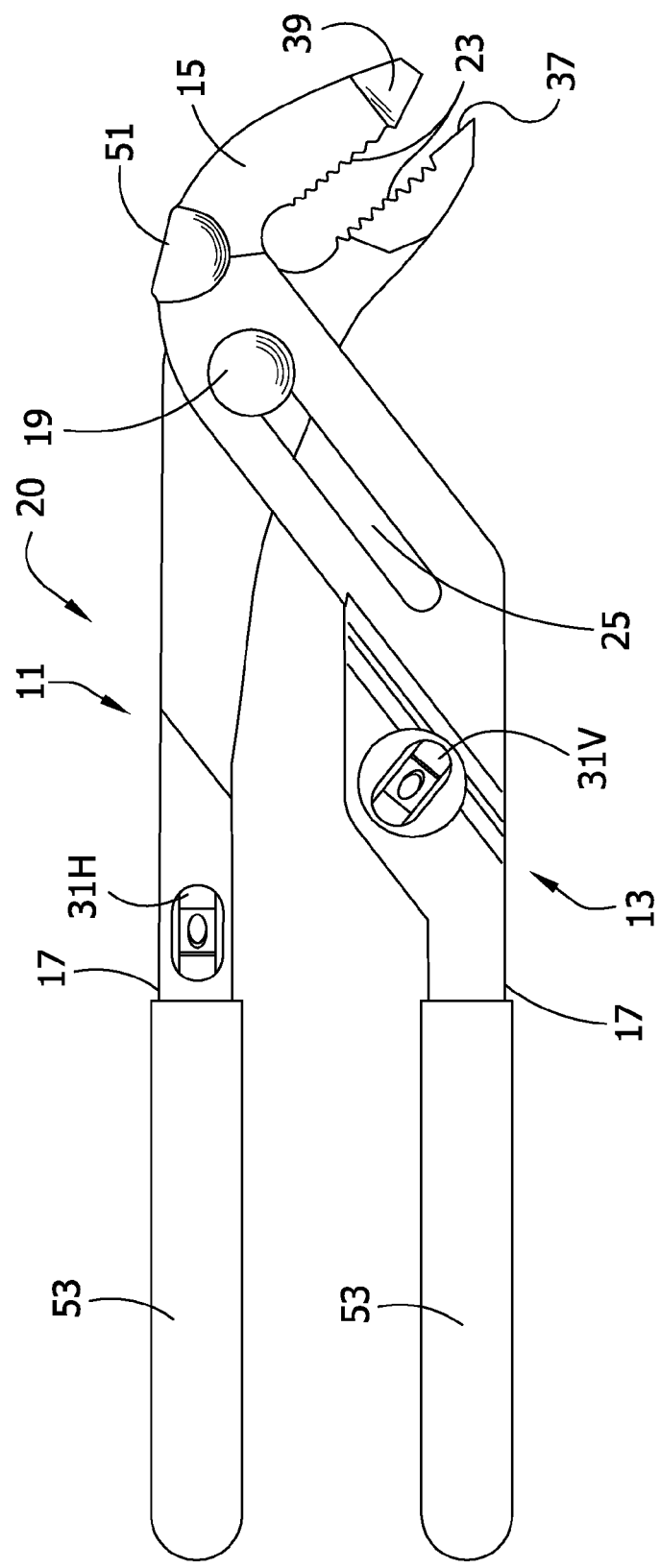

At least one of the grips 17 of the multipurpose tool 20 is adapted to remove burrs formed along a periphery of a cut pipe 21. In the illustrated embodiment, the first and second arms 11, 13 each have two outwardly facing edges 49 that can be used to scrape burrs from the inner edge of cut pipe 21. The edges 49 are defined by the corners of the grips, which have a generally square cross-section. In operation, the grips 17 of the tool 20 are brought together and slid inside the pipe until all four of the outer edges 47 of the grips 17 engage the inner edge of the pipe. The pipe 21, tool 20, or both are then rotated with respect to one another, generally about axis of the pipe, thereby causing the edges 47 of the grips 17 to scrape any burrs from the cut pipe. As mentioned above, the arms 11, 13 can be adjusted to change the location of the pivot axis, which also adjusts the relative spacing between the two grips 17 in the closed position, and the selected position can be maintained by the tongue and groove system. Thus, the grips 17 can be adjusted for removing burrs in pipes 21 (shown in phantom) of different diameters as illustrated in FIGS. 9A and 9B. For pipe 21 with cut ends and diameters larger than the width of the tool 20, the tool can be angled with respect to the pipe, thereby engaging the outer edges 47 of the grips 17 and the inner edge of the pipe (FIG. 9B). For small diameter pipes 21, a single arm can be used in a similar manner (FIG. 9C).

As best illustrated in FIG. 2, the multipurpose gripping tool 20 also comprises a hammer (or boss 51) for striking surfaces (e.g., driving nails). The boss 51 is positioned on the outer surface of the jaws 15 of the second arm 13 and has an outwardly facing circular surface for striking surfaces. With the jaws 15 moved to their retracted, closed position, the grips 17 are positioned adjacent one another and can collectively be used as a handle for swinging the tool 20 to strike surfaces with the boss 51.

The multipurpose tool 20 further comprises removable grip covers 53 for covering the grips. The grip covers 53 comprise a layer of material, such as rubber, formed to cushion and ease pressure on the user's hand and increase friction between the grips 17 and the user's hand. In the illustrated embodiment, the grip covers 53 cover the screwdriver bit 43 and the rounded end 47. As a result, the grip covers 53 need to be removed before these features of the tool 20 can be used. Moreover, the grip covers 53 also need to be removed when the tool 20 is used to determine the orientation of a surface. In another configuration (not shown), the grips 17 are covered by the grip covers 53 while allowing the use of the level vials 31. In this configuration, the portion of the grips 17 receiving the grip covers have a reduced cross-sectional area equal to the thickness of the grip covers 53. Thus, the outwardly facing surfaces, which comprise both the grips and grip covers, have substantially continuous smooth, and flat surfaces suitable for use in determining the orientation of a surface. It is understood that the tool 20 may not have grip covers or that the grip covers 53 may be made from other suitable materials without departing from the scope of this invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A multipurpose tool for gripping an object and determining an orientation of a surface, said tool comprising:
   a first arm comprising a jaw at one end and a grip at an opposite end;
   a second arm pivotally connected to said first arm about a pivot point, said second arm comprising a jaw at one end and a grip at the opposite end;
   said grips being moveable between an open position for opening the jaws and a closed position for closing the jaws; and
   a plurality of level vials, each of said plurality of level vials mounts on one of said first and second arms, wherein at least one of the plurality of level vials comprises a horizontal level vial mounted on one of said first and second arms and at least one other of the plurality of level vials comprises a vertical level vial mounted on the other of said first and second arms, such that said arms may be placed into engagement with said surface for determining the orientation of said surface.

2. A multipurpose tool as set forth in claim 1 wherein said first arm has a slot therein and said second arm includes a pivot pin, said slot receiving said pivot pin for allowing said second arm to slide relative the first arm to adjust the pivot point of the arms and thereby adjust the distance between the jaws for engaging and grasping differently-sized objects.

3. A multipurpose tool as set forth in claim 2 wherein said first and second arms are formed for engageable tongue and groove connection between the arms for retaining the pivot point at a selected location within said slot.

4. A multipurpose tool as set forth in claim 1 further comprising a cutting device, said cutting device including,
   an anvil located generally at a distal portion of one of said jaws, and
   a blade located generally at a distal portion of the other of said jaws and facing said anvil for cooperating with said anvil to cut.

5. A multipurpose tool as set forth in claim 1 wherein one of the arms is adapted to releasably mount at least one of a nut driver and a screwdriver bit.

6. A multipurpose tool as set forth in claim 1 wherein one of the grips has a rounded end adapted to function as a reamer.

7. A multipurpose tool as set forth in claim 1 wherein at least one of the grips is adapted to remove burrs formed along an edge of a cut pipe.

8. A multipurpose tool as set forth in claim 7 wherein the arms are adjustable to change the location of the pivot point for adjusting the distance between the two grips in the closed position for removing burrs in pipes of different diameters.

9. A multipurpose tool as set forth in claim 1 further comprising grip covers for covering said grips.

10. A multipurpose gripping tool comprising:
    a first arm comprising a jaw at one end and a grip at the opposite end;
    a second arm pivotally connected to said first arm about a pivot point, said second arm comprising a jaw at one end and a grip at the opposite end;
    an adjustable channel engagement system for allowing said second arm to slide relative to the first arm to adjust the pivot point of the arms and thereby adjust the distance between the jaws for engaging and grasping differently-sized objects;
    a horizontal level vial mounted on one of said first and second arms and a vertical level vial mounted on the other of said first and second arms; and
    a cutting device, said cutting device including an anvil located generally at a distal portion of one of said jaws and a blade located generally at a distal portion of the other of said jaws, said blade facing said anvil for cooperating with said anvil to cut.

11. A multipurpose gripping tool as set forth in claim 10 wherein said adjustable channel engagement system is a tongue and groove system wherein one of said arms is formed with at least one tongue and the other of said arms is formed with at least two grooves, said at least one tongue being adapted to align with and slide within any of said at least two grooves, thereby adjusting the pivot point of the arms by moving the at least one tongue to a different groove.

12. A multipurpose gripping tool as set forth in claim 10 wherein one of the arms is adapted to releasably mount at least one of a nut driver and a screwdriver bit.

13. A multipurpose gripping tool as set forth in claim 10 wherein one of the grips has a rounded end adapted to function as a reamer.

14. A multipurpose gripping tool as set forth in claim 10 wherein at least one of the grips is adapted to remove burrs formed along an edge of a cut pipe.

15. A multipurpose gripping tool as set forth in claim 14 wherein the arms are adjustable to change the location of the pivot point for adjusting the distance between the two grips in the closed position for removing burrs in pipes of different diameters.

16. A multipurpose gripping tool as set forth in claim 10 further comprising grip covers for covering said grips.

17. A multipurpose gripping tool comprising:
    a tongue and groove pliers having a first arm including a jaw at one end and a grip at the opposite end, and a second arm pivotally attached to the first arm about a pivot point, the second arm including a jaw at one end and a grip at the opposite end;
    a cutting device including an anvil located generally at a distal portion of one of said jaws and a blade located generally at a distal portion of the other of said jaws, said blade facing said anvil for cooperating with said anvil to cut; and
    a horizontal level vial and a vertical level vial, said horizontal level vial and said vertical level vial being mounted on different arms.

18. A multipurpose gripping tool as set forth in claim 17 wherein one of the arms is adapted to releasably mount at least one of a nut driver and a screwdriver bit.

19. A multipurpose gripping tool as set forth in claim 17 wherein one of the grips has a rounded end adapted to function as a reamer.

20. A multipurpose gripping tool as set forth in claim 17 wherein at least one of the grips is adapted to remove burrs formed along an edge of a cut pipe, said arms being adjustable to change the location of the pivot point for adjusting the distance between the two grips in the closed position for removing burrs in pipes of different diameter.

21. A multipurpose gripping tool as set forth in claim 17 further comprising grip covers for covering said grips.

* * * * *